Feb. 10, 1953 — G. F. WALES — 2,627,758
CLUTCH MECHANISM
Filed Feb. 26, 1947 — 4 Sheets-Sheet 1

INVENTOR.
George F. Wales

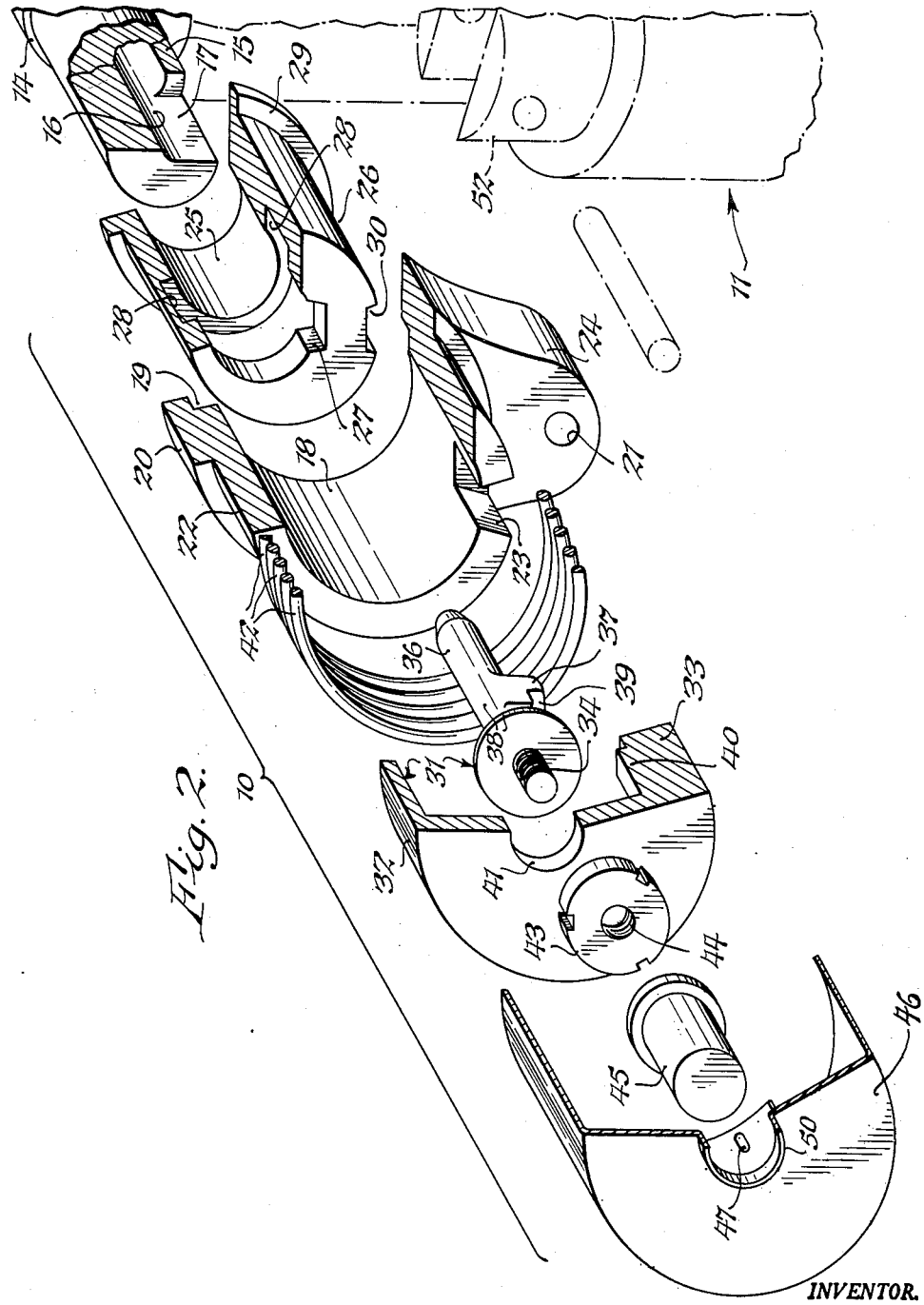

Feb. 10, 1953 G. F. WALES 2,627,758
CLUTCH MECHANISM
Filed Feb. 26, 1947 4 Sheets-Sheet 3
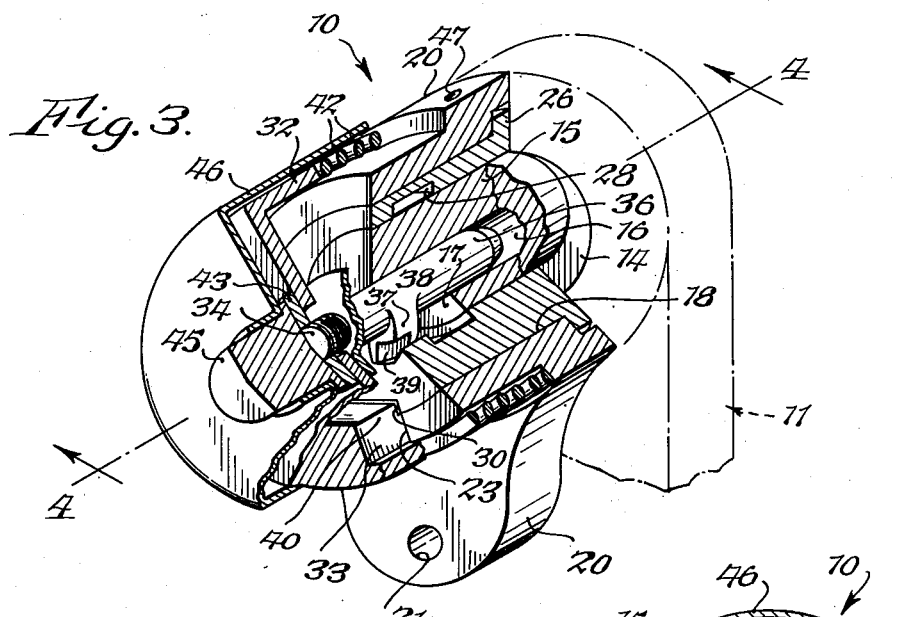
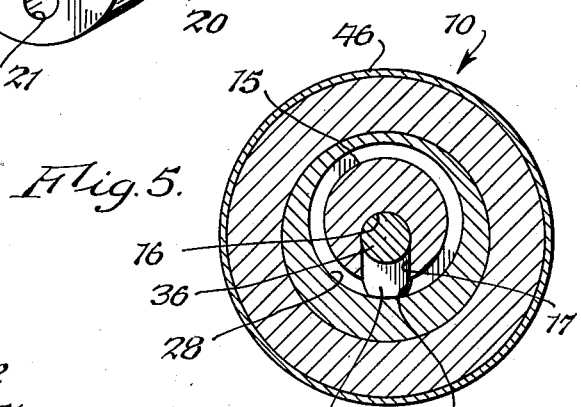
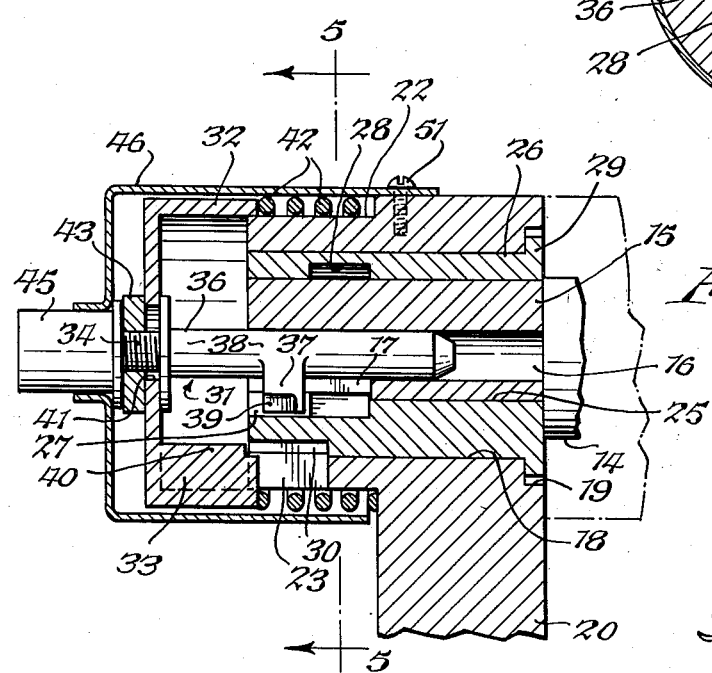
INVENTOR.
George F. Wales Feb. 10, 1953  G. F. WALES  2,627,758
CLUTCH MECHANISM
Filed Feb. 26, 1947  4 Sheets-Sheet 4
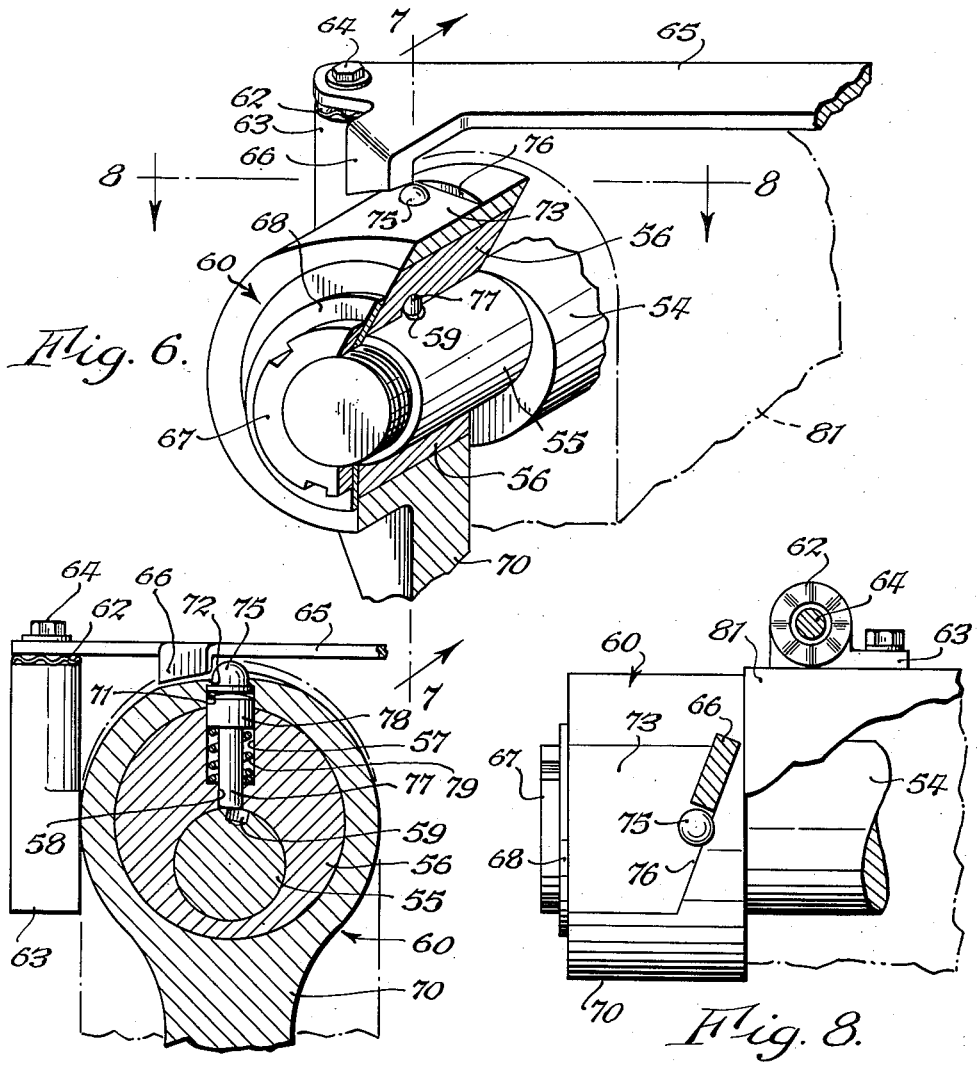
INVENTOR.
George F. Wales Patented Feb. 10, 1953

2,627,758

UNITED STATES PATENT OFFICE 2,627,758

CLUTCH MECHANISM

George F. Wales, Kenmore, N. Y.

Application February 26, 1947, Serial No. 730,903

25 Claims. (Cl. 74—570)

This invention relates generally to clutch means for transmitting the energy from a rotating shaft to a reciprocating member and more particularly to a clutch for apparatus utilizing an eccentric crank-throw for operating some moving part, such as the ram of a press-working machine tool.

Mechanical clutches for apparatus such as press-working machine tools have heretofore consisted of a toothed clutch mechanism called a dog clutch which is adapted to couple, at the operator's will, a driven flywheel to a crankshaft which in turn actuates the press-working ram. Means are provided for operating the clutch, for disengaging it at the appropriate position of the crankshaft movement and arresting the momentum of the moving crankshaft and its coupled ram so that the ram is accurately positioned for the next stroke. These means consist of suitable controls embodying a non-repeat mechanism which with a cam means associated with the crankshaft for disengaging the dog clutch, and a frictional brake, resisting movement of the crankshaft, assures a uniform single stroke of the ram when the clutch is actuated.

Mechanical clutches of this category are in general satisfactory for their intended purpose but they are numerous disadvantages which I will discuss herein. From the description and drawings of my invention, it will then be apparent that my clutch overcomes these disadvantages and provides a more satisfactory and reliable clutch.

The structural disadvantages of the present mechanical clutches will be considered first. In the existent clutch construction, the entire clutch engagement and press-working loads are transmitted directly through the mating surfaces of the toothed members. In order to withstand this high stress and wearing action the toothed members must be accurately machined and matched to each other to assure equal stresses being applied to each tooth. The mechanical components of these clutches must be exceedingly rugged for long wear and safe reliable operation.

From a manufacturing standpoint, the multiplicity of accurately machined and matched parts in the present clutch means is costly. In addition, the several sub-assemblies of flywheel, clutch components, friction brake, crankshaft, actuating linkage and non-repeat mechanism must be carefully assembled and then adjusted on the machine to operating efficiency. This is not conducive to mass production and low costs which generally requires that sub-assemblies shall be assembled complete and then rapidly mounted in operative condition to the main assembly.

Considering now the servicing of the dog clutch mechanism, the periodic adjustments required in the complex actuating and non-repeat mechanism is costly both in actual service costs and loss of manufacturing revenue while the machine is down. The above mentioned costs are increased still further when it becomes necessary to remove worn clutch components from the machine. Additional difficulties are encountered in assembling new parts to the press in that manufacturing discrepancies and wear make assembly difficult and sometimes make alteration necessary so that the new parts will function satisfactorily with the old worn parts.

Since the present trend is toward the use of women operators on some press-working equipment, it is apparent that the force required to actuate the clutch mechanism must be held to to minimum to avoid operator fatigue. This has made it imperative to provide greater clutch actuating leverage or power driven means to actuate the existing types of mechanical clutches. The additional parts and servicing required to accomplish this ease of actuation increases the respective costs still further.

In order to overcome the objectionable features of the existing clutch devices as discussed above, I have invented the clutch which is illustrated, described and claimed herein. Since this clutch is particularly advantageous when used in conjunction with an end-wheel gap-type press of the character illustrated in Fig. 13 of my Patent No. 2,364,011, I prefer to discuss its use with such a press. However, it will be apparent that it can be easily modified to other like applications with ease and I intend that all such modifications can be included.

In the end-wheel gap-type construction, the clutch and flywheel are positioned at the back of the machine and drive a long crankshaft which actuates the ram positioned at the front of the machine. This increases the mechanical difficulties as a much heavier crankshaft is required for torsional rigidity and to transmit the same energy over a long span. This, in turn, raises the shock loads encountered when the clutch is actuated, as the crankshaft is instantly accelerated when the clutch engages and the heavier crankshaft increases the clutch engagement load. The frictional force required to stop the heavier crankshaft, when the clutch disengages, is also greater. As a result, all the operating parts of a press of this type must be more rugged to withstand the greater loads imposed thereon.

Having discussed the foregoing disadvantages of the existing mechanical clutches, particularly as applied to end-wheel gap-type press-working machines, the advantages of my present device will now be apparent.

The primary object of this invention is to provide a simple, economical clutch for transmitting energy from a rotating shaft to a reciprocating member which is positive in action and rugged and durable in use.

A related object of this invention is to provide an integral compact clutch wherein the engaging means in the clutch is subjected to a much smaller clutch engagement shock load.

A companion object of this invention is to provide a clutch wherein the engagement means are not subjected to the press-working forces.

Still another important object of this invention is to provide a simple integral clutch means which may be assembled or disassembled as a unit from the main apparatus.

Yet another object of this invention is to provide a clutch which may be easily serviced.

Still a further object of this invention is to provide an integral clutch adapted to be positioned adjacent the work area of a machine tool whereby the customary clutch-actuating linkage may be dispensed with.

Yet another object of this invention is to provide a clutch wherein the parts are easily machined and not subjected to close and critical tolerances.

Still another object of this invention is to provide self-energizing clutch-actuating means whereby the actuating force is reduced to a minimum.

Other objects and advantages of this invention will appear from the following description and claims.

Fig. 2 is an exploded perspective view of this clutch assembly, in partial section and taken as indicated along line 2—2 of Fig. 1, to illustrate the interrelation of the components of the clutch.

Fig. 3 is a perspective view, in partial section, of the assembled clutch which illustrates, with Fig. 2, the relative functions of the components of the clutch.

Fig. 4 is a sectional side elevation of the clutch means, taken as noted along line 4—4 of Fig. 3, which illustrates in greater detail the coupled keying devices of the clutch-actuating mechanism.

Fig. 5 is a sectional rear elevation of the clutch, taken as noted along line 5—5 of Fig. 4, which illustrates the keyway in the eccentric bushing which is engaged by the clutch idling key when the clutch is idling and the annular passage in said bushing for receiving the key when the clutch is actuated through its punching stroke.

Fig. 6 is a perspective view, in partial section, of a modified version of this clutch embodying a single transfer keying device and illustrating the respective positions of the clutch-actuating mechanism at the instant prior to clutch actuation.

Fig. 7 is a sectional front elevation of this clutch, taken as noted along line 7—7 of Fig. 6, to illustrate the single transfer keying device.

Fig. 8 is a plan view, in partial section and taken as noted along line 8—8 of Fig. 6, which illustrates the cam on the clutch pitman arm for throwing the clutch-actuating mechanism out of engagement.

Fig. 9 is a front elevational view of the clutch at the bottom of its punching stroke and indicating the respective idling and punching paths of a point on the clutch housing.

Figure 1:
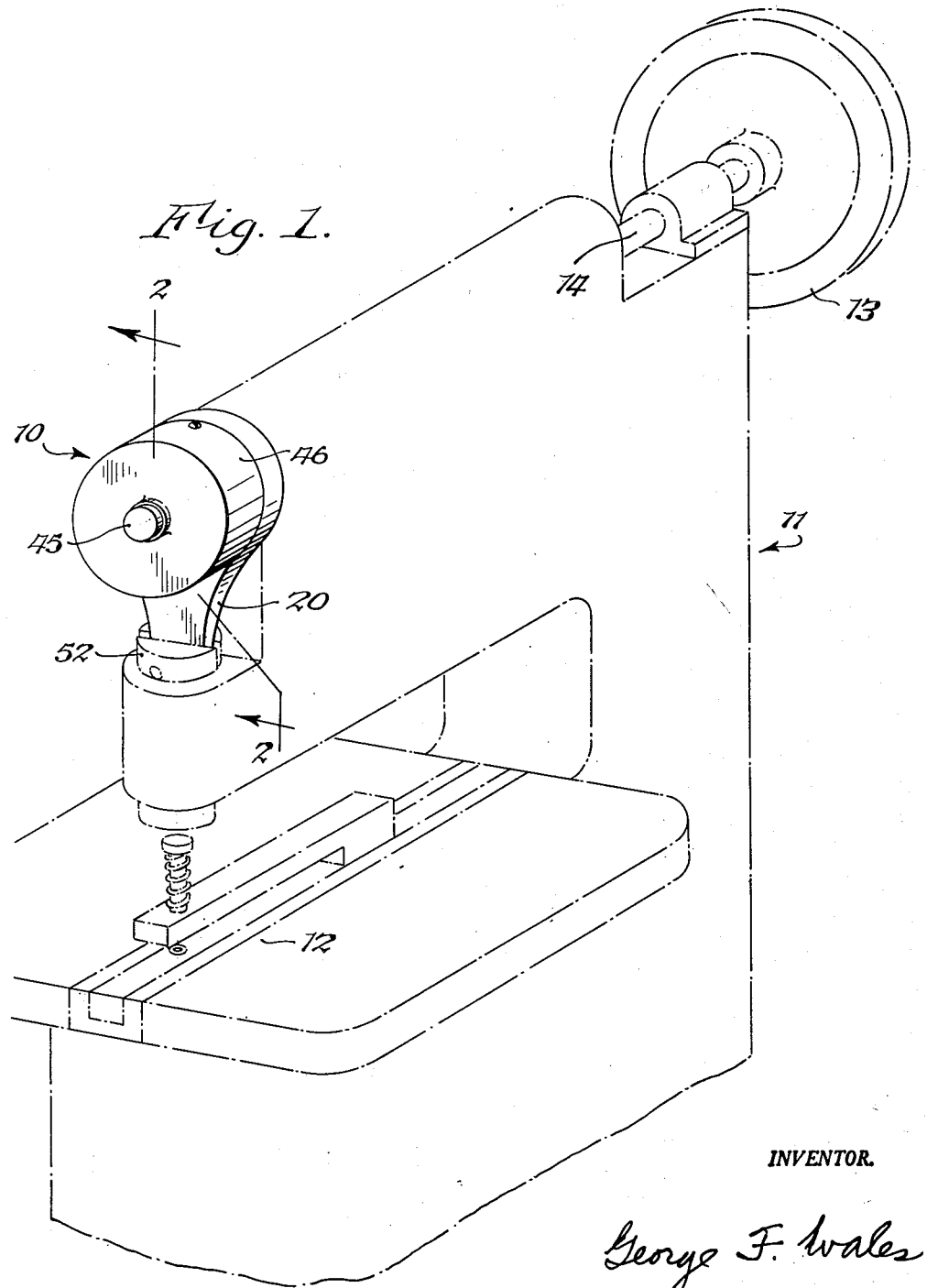
Fig. 1 is a perspective phantom view of an end-wheel gap-type punch press with one version of this novel clutch operably mounted thereto.

In Fig. 1 I have illustrated my clutch 10 as it would appear when operably mounted to an end-wheel gap-type press 11 of the same general character as is illustrated in Fig. 13 of my Patent No. 2,364,011. It will be noted that clutch assembly 10 is in juxtaposition to the press work area 12 and operating linkage may be dispensed with as a button 45 can be used for this purpose. This compact construction makes the clutch assembly 10 an operative sub-assembly which can be installed on eccentric 15 of shaft 14 (Figure 3) as an assembly.

It is also obvious, to one skilled in the art, that in my present invention shaft 14 is continuously revolving and that only the inertia of pitman arm 29 and ram 52 must be overcome when clutch 10 is actuated whereas in most existing clutches in like applications the inertia of the long crankshaft must also be overcome by the clutch 131.

Having considered the above basic advantages of my present invention, I will now describe the construction of the preferred version of this clutch.

In accordance with this invention, I employ an eccentric crankpin at the driving end of a crankshaft. A second eccentric is provided in the form of a bushing, having an eccentricity equal to the eccentricity of the crankpin and journalled thereon. Journalled on this eccentric bushing is a pitman arm which is adapted to reciprocate the ram of the press-working machine. Since the eccentricities of the crankpin and the bushing are equal, rotation of the bushing relative to the crankpin will cause it to pass through one point wherein their eccentricities complement one another and the bore in the pitman arm will be co-axial with the crankshaft and; a point diametrically opposed to the first position wherein their eccentricities supplement one another so that the bore of the pitman arm is displaced from the axis of the crankshaft a distance equal to the sum of the eccentricities of the crankpin and bushing. By providing means whereby the bushing can be caused to rotate with the crankpin in a complementing position or stopping the bushing relative to the crankpin, I provide means for maintaining the pitman inoperative or actuating it through a press-working stroke.

In the particular embodiment of my invention shown in Figs. 1 to 5, the eccentric crankpin 15 is an integral extension of crank shaft 14. A guide bore 16 is formed co-axial with crankshaft 14 in crankpin 15 with an associated keyway 17 for slidably receiving the guide rod 36 and key portion 37, respectively, of idling key 38. The engagement of key portion 37 with keyway 17 causes idling key 38 to revolve with crankpin 15 of shaft 14 at all times. The eccentric bushing 26 has an eccentric bore 25 formed therethrough, having an eccentricity equal to the eccentricity of crankpin 15 with crankshaft 14, said bore 25 permitting bushing 26 to be journalled on crankpin 15. A keyway 27 and annular key receiving chamber 28 in bushing 26 are adapted to also receive key portion 37 of idling key 38, whereby bushing 26 may be driven by crankpin 15 when crankshaft 14 is revolved and key portion 37 is engaging keyway 27 or be uncoupled from crankpin 15 when key portion 37 is slidably actuated so that it is freely revolvable in annular chamber 28. When bushing 26 is keyed to crankpin 15 and revolvable therewith the exterior of bushing 26 is co-axial with crankshaft 14 as the eccentricities of bushing 26 and crankpin 15 complement one another. The press pitman arm 20 has a bore 18 whereby it may be journalled on bushing 26 and an enlarged bore 19 adapted to receive the shoulder 29 of bushing 26. A cylindrical clutch actuating key member 32 is provided which is adapted to be slidable on the reduced cylindrical portion 22 of pitman arm 20 and has a key portion 33 formed integral therewith for engaging the keyway 23 formed in pitman arm 20 at all times. A stepped portion 40 of key 33 is adapted to selectively engage keyway 30 formed in bushing 26. Key member 32 has an eccentric enlarged hole 41 through which the threaded shank 34 of idling key member 38 is inserted and lock nut 43 is threadedly engaged therewith and staked so that key members 38 and 32 are coupled together for axial movement only. This provides a clutch-actuating key assembly 31 consisting of idling key member 38 and actuating key member 32. The spring 42 biases clutch actuating assembly 31 towards the press idling position. This resilient force is resisted by actuating button 45 and the clutch key assembly retainer case 46 which in turn is fastened to pitman arm 20 through screws 51 and screw holes 47.

In Figs. 2 and 3 the details of the assembled clutch are illustrated. It is apparent from these views that clutch assembly 10 is an integral self-contained sub-assembly which can be assembled or disassembled to the press merely by sliding bushing 26 on crankpin 15 with idling key 38 positioned so that key 37 is aligned with keyway 17 of crankpin 15. When the bore 21 of pitman 20 is aligned with ram 52 of press 11 and pivotally fastened thereto the clutch 10 and press 11 are ready for operation. To disassemble clutch 10 from press 11, the operation is reversed. It is now obvious from the foregoing discussion that clutch assembly 10 is much more compact than other clutches of this type and that its installation to the press is simple and rapidly accomplished. This construction makes it easily adaptable to the mass production techniques and provides rapid means of servicing the clutch by substituting bench tear-down and inspection for the more costly adjustment and inspection on the machine.

In addition, the low cost of the clutch makes it desirable to have a spare clutch for installation in place of a clutch which requires servicing, thus reducing machine down time to a few minutes.

In Figs. 3 and 4 the idling position of the clutch components are shown. Key portion 37 of key 38 is coupling bushing 26 to eccentric 15 whereby the eccentricities of these two parts are complementing each other so that the bore 18 of pitman arm 20 is co-axial with crankshaft 14. Bushing 26 is rotating with crankpin 15 and crankshaft 14. When the operator depresses actuating button 45, the stepped key portion 40 of clutch actuating key 33 engages keyway 30 of bushing 26 which arrests its rotation. Simultaneously, idling key 38 is caused to move in keyways 17 and 27 toward annular chamber 28 of bushing 26 until the tapered face 39 of key 37 is bearing against the edge of keyway 27 of bushing 26. Since idling key 38 is revolving with crankpin 15, the tapered face 39 of key portion 37, bearing on the edge of keyway 27, causes key portion 37 to enter annular chamber 28 of bushing 26 and its coupled key member 32 to force key 33 and its stepped portion 40 farther into engagement with keyway 23 of pitman arm 20 and keyway 30 of bushing 26 against the bias of resilient spring 42. With the eccentricity of bushing 26 maintained in the direction of the press ram, the eccentric crankpin 15 continues to rotate and idling key 37 rotates within annular chamber 28 of bushing 26. During the next revolution of crankshaft 14, the eccentricity of its crankpin 15 is supplementing the eccentricity of bushing 26 and at one half revolution the press ram is at its lowest point of the press-working stroke. As the crankpin 15 completes one revolution and key portion 37 of idling key device 38 is aligned with keyway 27 of bushing 26, as shown in Fig. 5, spring 42 causes keying assembly 31 to return to its former position which again keys bushing 26 for rotation with crankpin 15.

In Fig. 5 the key portion 37 of idling key 38 is shown to be wedge shaped. This construction reduces the shear stress imposed on key 37 as it tends to force rod 36 of idling key 38 tightly against bore 16 of crankpin 15 thereby reducing the shear stress on key 37 by transmitting it through compression. This construction, combined with other advantages of this clutch to be discussed later, permits the light yet rugged clutch described herein.

From the above description and reference drawings, it will be apparent that actuating key portion 33 and 40 are not subjected to any stress due to the press-working forces transmitted through the clutch. These forces are completely transmitted through the eccentric crankpin 15 and bushing 26 directly to pitman arm 20 and ram 52 of press 11. Inasmuch as the engagement shock loads imposed on key portion 33 and 40, of actuating key member 32 are negligible, as only the inertia of pitman arm 20 and bushing 26 must be overcome when clutch 10 is engaged since the inertia of ram 52 can be disregarded as its movement is infinitesimal at the instant of clutch engagement, the above clutch parts can be extremely light and easily machined, yet be rugged and durable in operation. The wedge shape of key portion 33 reduces the shear stress in a similar manner to key portion 37 of key 38.

In addition, since the only shock loads imposed on the idling key member 38 and actuating key member 32 are those due to the inertia or momentum of the bushing 26 and since the novel construction of key portion 37 and key portion 33, respectively, changes some of the shear stress to compression, the key members can also be relatively light. The above construction thus provides a small compact yet sturdy clutch member for press-working machines.

It will also be apparent, to those skilled in the art, that the action of inclined surface 39 of key portion 37 on keyway 27, when the clutch is actuated, causes the clutch to actuate itself against spring 42 without the application of operator force except that necessary to move the key portion 37 the initial amount against spring 42. This self-energizing feature reduces the force exerted by the operator to a minimum thereby preventing fatigue and permitting the use of women on this machine without employing means for supplementing the force of the operator.

It will now be apparent, to those skilled in the art, that actuating button 45 and retainer case 46 could be dispensed with or modified by slight structural changes and clutch 10 would be equally operable as the form illustrated is only one advantageous adaptation of this novel clutch. It is also obvious that the pitman arm housing 20 could be replaced by any suitable non-rotating member and that clutch 10 would not be impaired functionally.

In Figs. 6 to 9, a modified form of my invention is shown in which the eccentricity of the crankpin 55 and the complementing eccentric bushing 56 journalled thereon are combined in a different manner to effect the actuation of the clutch and provide a punching stroke. In this arrangement, two motions are imparted to the pitman 70, one of which consists of a clutch-actuating motion or stroke and the other of a punching stroke. The clutch-actuating stroke is equal to one half of the punching stroke. With the bushing 56 and crankpin 55 having eccentricities equivalent to the similar parts of my preferred clutch device 10, clutch 60 provides a punching stroke of twice the amplitude of my preferred device 10 with an idling or clutch-actuating stroke of one half the amplitude. This idling or clutch-actuating stroke moves the ram from the neutral position of the clutch 10 of Figs. 1 to 5 to a point above this neutral position which is equal to the punching stroke of the preferred clutch 10. By utilizing this eccentric idling or clutch-actuating stroke, I effect the actuation of this simple clutch 60 with a minimum of parts and operator force.

In Figs. 6 to 9 crankpin 55 is formed integral with a crankshaft 54. An eccentric bushing 56 is journalled on crankpin 55 and a pitman arm 70 is in turn journalled on bushing 56. Bushing 56 and pitman arm 70 are retained on crankpin 55 by means of nut 67 and washer 68. A clutch-actuating lever 65 is pivotally mounted at 64 to a press frame 81 by means of fitting 63. A waffle-type friction washer 62 acts to frictionally resist movement of clutch-actuating lever arm 65. Clutch-actuating lever arm 65 has a downwardly formed clutch-actuating cam 66. Pitman arm 70 has a cam 76 formed thereon, by removing a segment 73, so that it will cooperate with cam 66 to throw out clutch-actuating lever 65 after each punching stroke. A bore 71 in pitman arm 70 has a reduced bore 72 whereby transfer key actuating member 75 will be slidably retained therein. Member 75 bears on transfer key 77 which couples eccentric bushing 56 to pitman 70 during the idling or clutch-actuating stroke and bushing 56 to crankpin 55 during the punching stroke. Transfer key 77 has an enlarged portion 78 against which resilient means 79 bears to bias key 77 to its idling or clutch-actuating stroke position. Bushing 56 is provided with an enlarged bore 57 and a reduced bore 58 for slidably guiding transfer key 77 and providing a base for spring 79. Crankpin 55 has a bore 59 for receiving the reduced end of transfer key 77 for the punching stroke.

In Fig. 6 the clutch 60 is at the point in its actuating stroke just prior to clutch actuation. The operator has pivoted lever arm 65 toward press 81 and the pitman 70 is at the point $A_b$ in its actuating stroke $A_1$ detailed in Fig. 9.

In Fig. 7 it will be noted that cam 66 of lever arm 65 is about to engage transfer key-actuating member 75 whereby it will be depressed forcing transfer key 77 to uncouple bushing 56 from pitman 70 and simultaneously couple bushing 56 to crankpin 55. Bushing 56 and crankpin 55 will then rotate in unison causing pitman 70 to follow the punching stroke $A_2$ of Fig. 9.

In Fig. 8 it will be observed that cam 66 is being simultaneously engaged by cam 76 of pitman 70 to reset it to its inoperative position. This provides a simple non-repeat mechanism so that following one revolution transfer key 77 will again enter bore 71 and couple bushing 56 to pitman 70 and simultaneously uncouple bushing 56 from crankpin 55. The pitman arm 70 will then oscillate in the idling or clutch actuating stroke.

It will be apparent, to one skilled in the art, that clutch 60 incorporates the same principles as my preferred clutch 10 with several of the advantages of the previous clutch and is simple in construction. However, in this clutch transfer key 77 is subjected to shear stress from a portion of the press-working loads transmitted therethrough whereas in the clutch 10 key assembly 31 is subjected to none of these loads. Inasmuch as the clutch 60 is designed to begin the press-working stroke with the transfer key device 77 in a position about 30° from the bottom of the press-working stroke, the eccentricities of bushing 56 and crankpin 55 transmit most of the press-working loads. The portion transmitted by transfer key 77 is small as the moment arm of the forces is small at this point.

I claim as my invention:

1. Means for transmitting energy in a radial direction from a rotating shaft comprising a first eccentric carried by said shaft, a second eccentric journalled on said first eccentric, a member journalled on said second eccentric and key means for causing said second eccentric to be selectively keyed to said first eccentric or said member whereby its eccentricity complements or supplements the eccentricity of said first eccentric in the desired direction for transmitting energy from the rotating shaft.

2. Means for transmitting energy in a radial direction from a rotating shaft comprising a first eccentric carried by said shaft, a second eccentric journalled on said first eccentric, a member journalled on said second eccentric and key means for selectively keying the second eccentric for rotation with the first eccentric or for movement with said member.

3. Means for transmitting energy in a radial direction from a rotating shaft comprising a first eccentric carried by said shaft, a second eccentric journalled on said first eccentric, a member journalled on said second eccentric, a plurality of key devices and a plurality of associated keyways formed in said eccentrics for selectively keying said second eccentric whereby it complements or supplements said first eccentric in any chosen direction.

4. Means for transmitting energy in a radial direction from a rotating shaft including a first eccentric carried by said shaft, a second eccentric journalled on said first eccentric, a housing journalled on said second eccentric, key means for selectively keying the second eccentric to said first eccentric or said housing so as to complement or supplement said first eccentric and resilient biasing means for urging said key means to the position wherein said eccentrics complement one another.

5. Means for transmitting energy in a radial direction from a rotating shaft including a first eccentric carried by said shaft, a second eccentric journalled on said first eccentric, a housing journalled on said second eccentric, key means for selectively positioning the second eccentric to complement or supplement said first eccentric, resilient biasing means interposed between said housing and said key means for urging said key means to the position wherein said eccentrics complement one another, a retainer case adapted to be fastened to said housing to restrict movement of said key means and actuating means associated with said retainer case for actuating said key means against said resilient bias.

6. Means for transmitting energy in a radial direction from a rotating shaft including a first eccentric carried by said shaft, a second eccentric journalled on said first eccentric, a housing journalled on said second eccentric, key means for selectively keying the second eccentric to said first eccentric or said housing so as to complement or supplement said first eccentric, resilient biasing means interposed between said second eccentric and said key means for urging said key means to the position wherein said eccentrics complement one another and means associated with said housing for actuating said key means against said resilient bias.

7. Means for transmitting energy in a radial direction from a rotating shaft including a first eccentric carried by said shaft, a second eccentric journalled on said first eccentric, a housing journalled on said second eccentric, a key means for keying said eccentrics in a complementing attitude, a second key means for keying one of said eccentrics to said housing, means for coupling said key means whereby when one is engaged the other is disengaged, resilient biasing means for urging said coupled key means whereby said first key means is normally engaged and means for overcoming said resilient bias.

8. Means for transmitting energy in a radial direction from a rotating shaft including a first eccentric carried by said shaft, a second eccentric journalled on said first eccentric, a housing journalled on said second eccentric, a key device, a keyway formed in each eccentric for receiving said key device, an inclined face on said key device for engaging the edge of one of the keyways when said key is partially disengaged from said keyway, a second key device, a keyway formed in one of the eccentrics, a keyway formed in the housing, each adapted for receiving said second key device, means for coupling said key devices for related movement and resilient biasing means for urging said coupled key devices whereby said first key device is normally engaging said eccentrics.

9. Means for transmitting energy in a radial direction from a rotating shaft including a first eccentric carried by said shaft, a second eccentric journalled on said first eccentric, a housing journalled on said second eccentric, a key device, a related keyway in each eccentric for receiving said key device, an inclined face formed in said key device so that when said key device is partially disengaged from one of said keyways said inclined face acting against said keyway will cause complete disengagement of said key device, a second key device coupled for related movement with said first key device, a related keyway formed in one of said eccentrics and said housing for receiving said second key device, and resilient means for biasing said first key device into engagement with its related keyway.

10. Means for transmitting energy in a radial direction from a rotating shaft including a first eccentric carried by said shaft, a second eccentric journalled on said first eccentric, a housing journalled on said second eccentric, a key device, a related keyway in each eccentric for receiving said key device, an inclined face formed in said key device so that when said key device is partially disengaged from one of said keyways said inclined face acting against said keyways will cause complete disengagement of said key device, a second key device coupled for related movement with said first key device, a related keyway formed in one of said eccentrics and said housing for receiving said second key device, resilient means for biasing said coupled key devices whereby said first key device is normally engaged, a retainer case adapted to retain said key devices against said resilient bias and means slidable in said retainer case for actuating said coupled key devices against said resilient bias.

11. Means for transmitting energy in a radial direction from a rotating shaft including a support for said rotating shaft, an eccentric carried by said shaft, a second eccentric journalled on said first eccentric, a housing journalled on said second eccentric, a keyway bore formed in said first eccentric, a mating keyway bore formed through said second eccentric, a related keyway bore formed in said housing, a transfer key adapted to selectively engage the second eccentric to the housing or the first eccentric upon slidable movement of said transfer key in said second eccentric and means for biasing said transfer key into engagement with said housing.

12. Means for transmitting energy in a radial direction from a rotating shaft including a support for said rotating shaft, an eccentric carried by said shaft, a second eccentric journalled on said first eccentric, a housing journalled on said second eccentric, a keyway bore formed in said first eccentric, a mating keyway bore formed through said second eccentric, a related keyway bore formed in said housing, a transfer key adapted to selectively engage the second eccentric to the housing or the first eccentric upon slidable movement of said transfer key in said second eccentric, and an actuating plunger slidably retained in the bore in said housing and means for biasing said transfer key into engagement with the plunger in said housing.

13. Means for transmitting energy in a radial direction from a rotating shaft including a support for said rotating shaft, an eccentric carried by said shaft, a second eccentric journalled on said first eccentric, a housing journalled on said second eccentric, a keyway bore formed in said first eccentric, a mating keyway bore formed through said second eccentric, a related keyway bore formed in said housing, a transfer key adapted to selectively engage the second eccentric to the housing or the first eccentric upon slidable movement of said transfer key in said second eccentric, an actuating plunger slidably retained in the bore in said housing, means for biasing said transfer key into engagement with the plunger in said housing and means pivotal on the support for said shaft for actuating the plunger in said housing upon movement relative thereto.

14. Means for transmitting energy in a radial direction from a rotating shaft including a support for said rotating shaft, an eccentric carried by said shaft, a second eccentric journalled on said first eccentric, a housing journalled on said second eccentric, a keyway bore formed in said first eccentric, a mating keyway bore formed through said second eccentric, a related keyway bore formed in said housing, a transfer key adapted to selectively engage the second eccentric to the housing or the first eccentric upon slidable movement of said transfer key in said second eccentric, an actuating plunger slidably retained in the bore in said housing, means pivotal on the support for said shaft for actuating the plunger in said housing upon movement relative thereto and a cam surface, formed in said housing for resetting said pivotal means following actuation.

15. Means for transmitting energy in a radial direction from a rotating shaft including a support for said rotating shaft, an eccentric carried by said shaft, a second eccentric journalled on said first eccentric, a housing journalled on said second eccentric, a keyway bore formed in said first eccentric, a mating keyway bore formed through said second eccentric, a related keyway bore formed in said housing, a transfer key adapted to selectively engage the second eccentric to the housing or the first eccentric upon slidable movement of said transfer key in said second eccentric, an actuating plunger slidably retained in the bore in said housing, means pivotal on the support for said shaft for actuating the plunger in said housing upon movement relative thereto, friction means for dampening movement of said pivotal means and a cam surface, formed in said housing for resetting said pivotal means following actuation.

16. Means for keying a pair of relatively rotating members to each other comprizing a keyway formed in one of the members, a key device slidable therein, said key device being also supported against radial thrust, a frustro pyramidal key portion formed radially on said key device, a keyway formed in said other member to receive the frustro-pyramidal portion of said key device whereby the initial shock engagement of said frustro-pyramidal key portion and its keyway causes a portion of the stress to be transmitted radially through said key portion to said first member.

17. In a clutch for transmitting energy radially from a rotating shaft, an eccentric formed on said shaft, a second eccentric journalled thereon, a non-rotating member in juxtaposition to said second eccentric, a coupled key assembly including a key device for engaging one of said eccentrics to the other and a second key device for engaging one of said eccentrics to the non-rotating member, upon movement of said coupled key assembly to affect disengagement of said eccentrics by said first key and means for resiliently biasing said coupled key assembly against said movement.

18. In a self-contained clutch assembly to be actuated by the crank of an apparatus and a keyway formed therein, an eccentric bushing adapted to be journalled on the crank, a pitman arm journalled on said bushing, a key device for engaging the eccentric bushing to the crank so as to complement its eccentricity, means for shifting said key to effect disengagement of said crank and said bushing, a second key device, coupled to said first key device for engaging the eccentric bushing to the pitman arm upon shifting of said first key device and resilient means for biasing said first key into engagement.

19. In a self-contained clutch assembly to be actuated by the crank of an apparatus and a keyway formed therein, an eccentric bushing adapted to be journalled on the crank, a pitman arm journalled on said bushing, a key device for engaging the eccentric bushing to the crank so as to complement its eccentricity, means for shifting said key to effect disengagement of said crank and said bushing, a second key device, coupled to said first key device for engaging the eccentric bushing to the pitman arm upon shifting of said first key device, resilient means for biasing said first key into engagement, a retainer case for restricting movement of said coupled key devices and means associated with said retainer case for actuating said key devices against said resilient bias.

20. In a self-contained clutch assembly to be actuated by the crank of an apparatus and a keyway formed therein, an eccentric bushing adapted to be journalled on the crank, a pitman arm journalled on said bushing, a transfer key device slidable in said bushing which is adapted to engage said crank or said pitman upon relative movement whereby said bushing is positioned so that its eccentricity complements or supplements the eccentricity of the crank in the desired direction for transmitting energy from the crank and resilient means for biasing said key device to the position whereby said eccentric bushing complements said crank.

21. In a self-contained clutch assembly to be actuated by the crank of an apparatus and a keyway formed therein, an eccentric bushing adapted to be journalled on the crank, a pitman arm journalled on said bushing, a transfer key device slidable in said bushing which is adapted to engage said crank or said pitman upon relative movement whereby said bushing is positioned so that its eccentricity complements or supplements the eccentricity of the crank in the desired direction for transmitting energy from the crank, resilient means for biasing said key device to the position whereby said eccentric bushing complements said crank and means slidable in said pitman for actuating said key device against said resilient bias.

22. A self-contained clutch assembly to be actuated by the crank of an apparatus, a keyway formed therein and an actuating lever pivotal on said apparatus which comprizes; an eccentric bushing journalled on the crank, a keyway formed in said bushing, a transfer key slidable in said keyway, resilient means for biasing said transfer key, a pitman arm journalled on said bushing, a keyway formed therein and a key actuating member slidable in the keyway of the pitman arm which is adapted to actuate said transfer key when engaged by said pivotal lever on said apparatus.

23. A self-contained clutch assembly to be actuated by the crank of an apparatus, a keyway formed therein and an actuating lever pivotal on said apparatus which includes; an eccentric bushing journalled on the crank, a keyway formed in said bushing, a transfer key slidable in said keyway, resilient means for biasing said transfer key, a pitman arm journalled on said bushing, a keyway formed therein, a cam surface formed on said pitman arm and a key actuating member slidable in said keyway of the pitman arm said key actuating member and said cam surface being adapted to actuate said clutch and reset the actuating lever on the apparatus upon movement of said lever relative to said clutch.

24. Means for converting the rotary movement of a driving shaft to a reciprocating movement, said means comprising a first eccentric driven by said shaft, a second eccentric, one of said eccentrics being journalled on the other, clutch means for connecting said eccentrics so that they are held against relative angular movement and are caused to turn as a unit by said shaft and for disconnecting said eccentrics while holding one of said eccentrics against angular movement so that the other only of said eccentrics is driven by said shaft as the latter continues to rotate, and means for automatically causing said clutch means to again connect said eccentrics when said shaft reaches the angular portion at which said eccentrics were disconnected.

25. Means for transmitting the rotary movement of a driving shaft to a member to be driven including an eccentric which is driven by said shaft, a second eccentric, one of said eccentrics being journalled on the other and having said member journalled on it, means including a clutch element for connecting one of said eccentrics to the other to hold said eccentrics against relative angular movement with respect to one another, a second clutch element for connecting the other of said eccentrics to said member so that it will be held against relative angular movement with respect thereto, and means connecting said clutch elements so that they may be simultaneously actuated to render one inoperative and the other operative and vice versa.

GEORGE F. WALES.

REFERENCES CITED

The following references are of record in the file of this patent:

UNITED STATES PATENTS

| Number | Name | Date |
| --- | --- | --- |
| 95,174 | Wells | Sept. 21, 1869 |
| 1,091,496 | Fox | Mar. 31, 1914 |
| 1,839,815 | Teece | Jan. 5, 1932 |
| 1,897,416 | Baum | Feb. 14, 1933 |
| 1,914,566 | Hazeltine | June 20, 1933 |
| 2,265,222 | Benes | Dec. 9, 1941 |